United States Patent
Bhatoolaul et al.

(10) Patent No.: US 7,076,015 B2
(45) Date of Patent: Jul. 11, 2006

(54) PREAMBLE DETECTOR FOR A CDMA RECEIVER

(75) Inventors: David Lahiri Bhatoolaul, Grange Park (GB); Pantelis Monogioudis, Edison, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 905 days.

(21) Appl. No.: 09/734,147

(22) Filed: Dec. 11, 2000

(65) Prior Publication Data

US 2001/0017881 A1 Aug. 30, 2001

(30) Foreign Application Priority Data

Dec. 15, 1999 (EP) ............................................ 99310117

(51) Int. Cl.
*H04L 7/00* (2006.01)
*H04L 27/06* (2006.01)

(52) U.S. Cl. ...................... 375/365; 375/316; 375/147; 375/354

(58) Field of Classification Search ................. 375/130, 375/140, 147, 150, 316, 343, 354, 365
See application file for complete search history.

(56) References Cited

U.S. PATENT DOCUMENTS

| | | | | |
|---|---|---|---|---|
| 5,267,271 A | * | 11/1993 | Rice | 375/343 |
| 5,463,657 A | * | 10/1995 | Rice | 375/150 |
| 5,598,429 A | * | 1/1997 | Marshall | 375/149 |
| 5,638,376 A | * | 6/1997 | Miki et al. | 370/342 |
| 5,761,239 A | * | 6/1998 | Gold et al. | 375/150 |
| 5,909,471 A | * | 6/1999 | Yun | 375/343 |
| 5,949,817 A | * | 9/1999 | Marshall | 375/142 |
| 5,953,370 A | * | 9/1999 | Durrant et al. | 375/150 |
| 6,381,229 B1 | * | 4/2002 | Narvinger et al. | 370/328 |

FOREIGN PATENT DOCUMENTS

| | | |
|---|---|---|
| WO | WO 98/332920 | 7/1998 |
| WO | WO 99/60729 | 11/1999 |

OTHER PUBLICATIONS

Slonneger et al, "Noncoherent Parallel Acquistion of Pn Sequences in Direct–Sequence Spread–Spectrum Systems", IEEE Second International Symposium on Spread Spectrum Techniques and Applications, Nov. 29–Dec. 2, 1992, pp.: 31–34.*

(Continued)

*Primary Examiner*—Chieh M. Fan
*Assistant Examiner*—Jason M. Perilla
(74) *Attorney, Agent, or Firm*—E. J. Rosenthal; D. A. Sarup (57) ABSTRACT

A method is provided of detecting one of a set of preamble sequences in a spread signal. The method includes: (a) correlating the received spread signal with sequences of a first orthogonal Gold code (OGC) set in accordance with a first fast transform to provide a preamble signal; (b) correlating the preamble signal with the set of preamble sequences in accordance with a second fast transform to generate a set of index values; (c) forming a decision statistic based on the set of index values; and (d) selecting, as the detected one of the set of preamble sequences, a preamble sequence corresponding to the decision statistic. Step (c) comprises the steps of: 1) forming an initial decision statistic based on the relative maximum index of the set of index values; 2) selecting the signal generated by the preamble sequence combined with the preamble signal corresponding to the initial decision statistic; 3) adjusting, in one or more of amplitude and phase, the signal selected in step 2); and 4) forming the decision statistic based on the adjusted signal.

20 Claims, 5 Drawing Sheets

OTHER PUBLICATIONS

Chawla et al, "Parallel acquisition of PN sequence in DS/SS systems", IEEE Transactions on Communications, vol.: 42, Issue: 5, May 1994, pp.: 2155–2164.*

Gibson, Jerry D., "The Communications Handbook", CRC Press, 1997, pp. 94–106.*

E.E. Sutter, "The Fast m–Transform: A Fast Computation Of Cross–Correlations With Binary m–Sequences*" "Siam Journal On Computing" Aug. 1991, vol. No. 4, pp. 686–694.

Monroe, Robert, et al "Preamble Code Structure And Detection Method And Apparatus" Database TXTUS2 Online! Us5987079 Nov. 16, 1999, claims 1, 3–7.

European Search Report, dated Jul. 28, 2000.

TSG–RAN Working Group 1 meeting #3 Ericsson, "New RACH Preambles With Low Auto–Correlation Sidelobes and Reduced Detector Complexity", Mar. 22–26, 1999.

* cited by examiner

PREAMBLE DETECTOR FOR A CDMA RECEIVER

CROSS-REFERENCE TO RELATED APPLICATION

This application claims priority of European Patent Application No. 99310117.9, which was filed on Dec. 15, 1999.

BACKGROUND OF THE INVENTION

1. Field of the Invention

The present invention relates to signal demodulation in a code-division, multiple-access (CDMA) telecommunication system, and, more particularly, to despreading and preamble detection of code sequences in a CDMA receiver.

2. Description of the Related Art

In wireless, cellular, or similar code-division, multiple-access (CDMA) telecommunication systems, multiple channels are defined for up-link (user to base station) and down-link (base station to user) communications. Generally, each channel includes a spread signal synchronized to a common timing reference. A pilot signal is an unmodulated code sequence that is a transmitted throughout the system for synchronization of the various code sequences (in time and in code phase), and the pilot signal is used by the spreading (modulation) and de-spreading (demodulation) operations. Channel signals may be spread, in frequency, using pseudo-random (PN) and/or orthogonal code sequences.

Signals transmitted through a channel are binary data represented by a sequence of values, each value termed a symbol. The spreading PN code sequence is also binary data represented by a sequence of values, each value called a chip. However, the width (length in time) of a chip is much less than the width of a symbol. For some systems operating in accordance with the IS-95 or wideband CDMA (W-CDMA) standards, each symbol may contain up to 256 chips. The spread signal may then be combined with an orthogonal code, such as a Walsh code (also known as a Walsh-Hadamaard sequence), to maintain relatively low to zero cross-correlation between multiple spread signals transmitted through a transmission medium. Each orthogonal code is also generated as a sequence of binary values, the width of each value equivalent to the symbol width.

Channels of these CDMA telecommunication systems may either be user channels or system channels. Voice, voiceband data, or data signals are generally transmitted over user channels, while system channels are used by a base station and users to broadcast information or are randomly accessed by users or the base station to establish a connection over a channel. The channels are usually spread using the same PN code sequences, and then each is spread with uniquely assigned orthogonal code signal. A receiver may then differentiate the channels using the unique, orthogonal code signal that is assigned to each channel. Since the same PN code sequence is used for all channels, and the PN code sequence phase is readily determined with reference to the pilot signal, detection of the orthogonal code signal occurs only at the beginning of the user's session. The sessions of user channels are relatively long, so the detection process for each user occurs relatively infrequently. In addition, the base station and user have the following a priori information: 1) the connection information when initialized, 2) the orthogonal code assigned to the user channel, and 3) coarse synchronization information for the initial detection process.

Commonly used channels, broadcast channels, or randomly-accessed channels, on the other hand, have bursty sessions that are relatively short, since only a small amount of information is exchanged between the user and base station, for example, to initialize a connection. In addition, the receiver has no a priori information about the code sequence used, and the potential code sequence changes relatively often. Consequently, the orthogonal code detection process for these channels may occur frequently, and systems desirably minimize the time required to perform detection. For these channels characterized by bursty sessions, a transmitter may use a preamble characterized by a signature sequence to enable rapid detection and demodulation of spread signals.

Figure 1A:
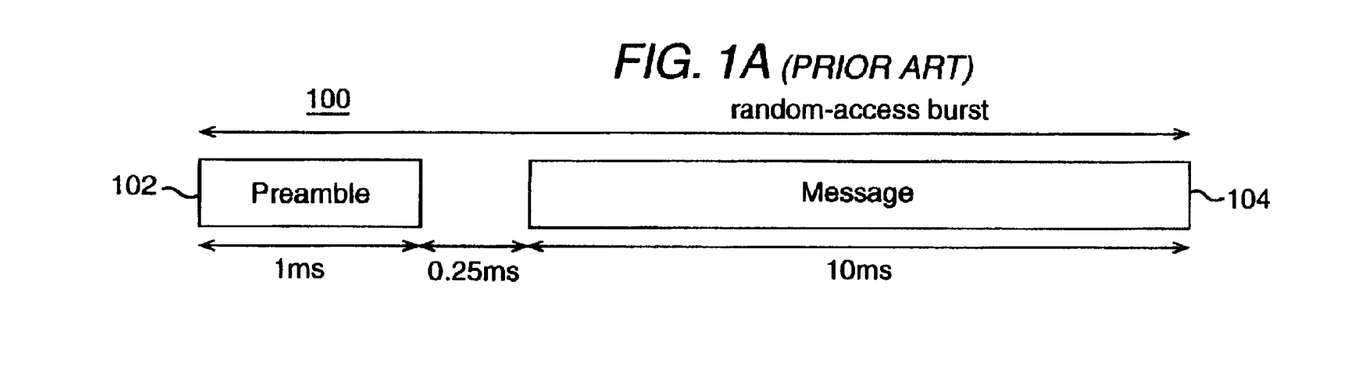
FIG. 1A shows a random access channel (RACH) burst of the prior art comprising a preamble and a message.
Figure 1B:
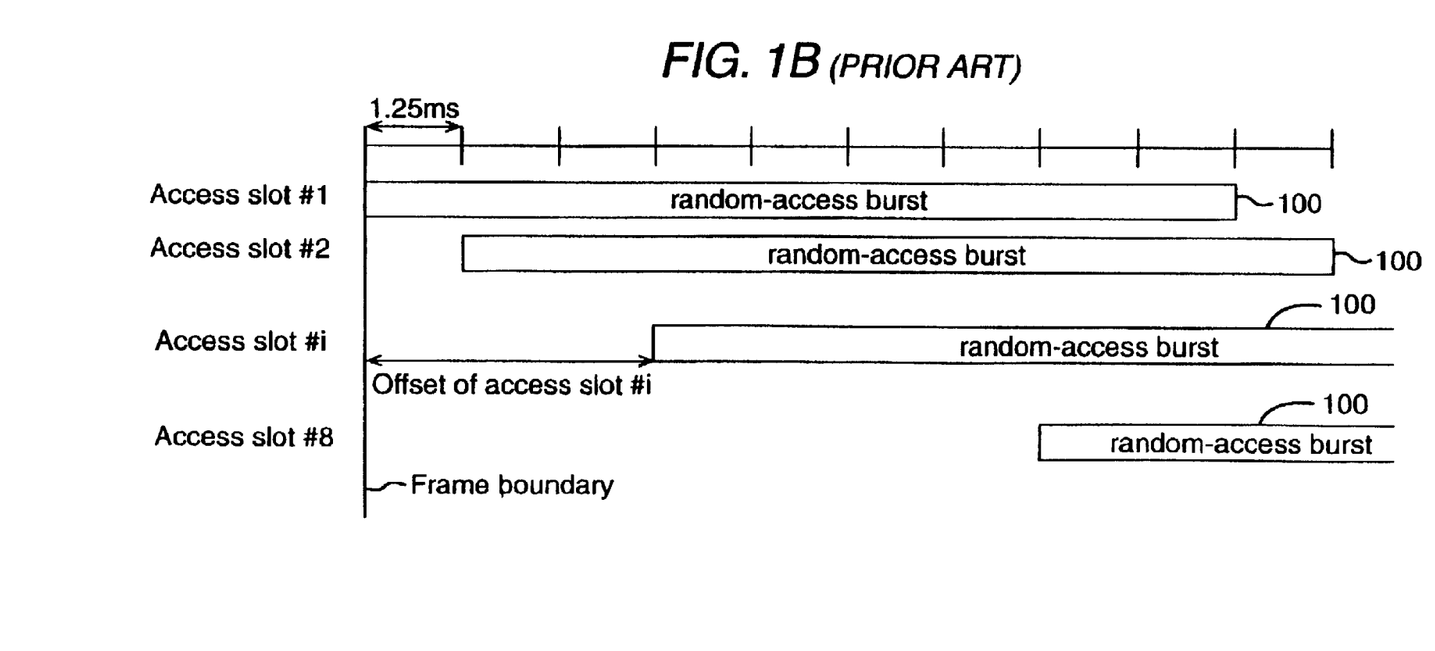
FIG. 1B shows a transmission timeline for offsets of RACH bursts as shown in FIG. 1A.

For example, a burst of the Random Access Channel (RACH) in accordance with W-CDMA standards is transmitted by the mobile user to initialize a dedicated set up procedure or for transporting data across the air interface (connectionless data transfer). A typical RACH burst 100 is shown in FIG. 1A and comprises preamble 102 and message 104. An idle time period of length 0.25 ms occurs between the preamble 102 and the message 104 that allows for detection of the preamble information (preamble signature sequence) and subsequent on-line processing of the message. The transmission time of each RACH burst 100 is randomly selected by the mobile according to 8 specified offsets, as shown in FIG. 1B, to increase throughput of the RACH data.

A preamble detector may employ the following a priori information to detect a given RACH preamble spreading (code number) and/or signature sequence. First, a user randomly selects one sequence out of a code set allocated to the specific sector. Second, the sequences are known but the number or subset available for use may vary depending on the traffic load of the sector. Third, the receiver (including the preamble detector) acknowledges multiple requests from RACH bursts occurring during the same frame offset.

A CDMA receiver may employ non-coherent demodulation of the signal of a user channel. For systems conforming to the IS-95 standard, for example, the receiver may use 64-ary, non-coherent demodulation (despreading) of channels. For this case, a demodulator generates all of the possible (i.e., 64) orthogonal code sequences and combines each with the received signal. A CDMA receiver may also employ coherent demodulation of the signal of a channel. In coherent demodulation, an initial estimate of the assigned code signal for the channel is determined from the received (actual code) signal. Using the initial estimate, a signal representing the error between the actual coded signal and the transmit code signal is employed to correct amplitude and phase deviations of the actual code signal.

Detection of the RACH burst preamble spans three axes. The first axis is the time axis that evaluates the energy content of hundreds of Tc/2 delay cells (Tc is the chip duration). The exact length of the uncertainty area depends on the size of the cell. The second axis is the code axis that evaluates these delay cells for all permissible spreading codes. The third axis is the frequency/phase uncertainty axis, which axis is related to the detection statistic (e.g., a non-coherent, quasi-coherent, or coherent decision statistic) used to determine the relative likelihood that the correct code with correct frequency and phase is detected.

SUMMARY OF THE INVENTION

The present invention relates to detection of one of a set of preamble sequences in a spread signal where either the preamble sequence is an orthogonal code sequence, the spreading sequence of the spread signal is an orthogonal code sequence, or both the preamble and spreading sequences are orthogonal code sequences. The orthogonal code sequences may be selected from either a set of Walsh-Hadamaard sequences or a set of orthogonal Gold code (OGC) sequences. Where the orthogonal code sequences are selected from the set of Walsh-Hadamaard sequences, a detector and/or demodulator may employ a fast Hadamaard transform (FHT) method for signal correlation. Where the orthogonal code sequences are selected from the set of OGC sequences, a detector and/or demodulator may employ a fast transform method based on the method used to generate the OGC sequences, the fast transform method including the FHT transform.

In accordance with an embodiment of the present invention, a preamble detector correlates the received spread signal with sequences of a first orthogonal Gold code (OGC) set in accordance with a first fast transform method to provide a preamble signal, wherein the spread signal is the preamble sequence combined with one sequence of the first OGC set. The preamble signal is then correlated with the set of preamble sequences in accordance with a second fast transform method to generate a set of index values. A decision statistic is formed based on the set of index values, and the preamble sequence corresponding to the decision statistic is selected as the detected one of the set of preamble sequences.

For another embodiment, the received spread signal is correlated with a set of orthogonal sequences to provide a preamble signal, wherein the spread signal is the preamble sequence combined with one sequence of the set of orthogonal sequences. The preamble signal is correlated with one or more preamble sequences of an orthogonal Gold code (OGC) set in accordance with a fast transform method to generate a set of index values. A decision statistic is formed based on the set of index values; and the preamble sequence corresponding to the decision statistic is selected as the detected one of the set of preamble sequences.

For some exemplary embodiments, either the spreading sequence or preamble sequence is selected from the OGC set formed from first and second sequence vectors, wherein the OGC set is generated from the first sequence vector and a cyclic shift matrix of a second sequence vector. The fast transform method is a fast orthogonal Gold code transform (FOGT) that comprises the following steps. First, the preamble signal is multiplied with a first sequence vector and a forward permutation vector to generate a permuted preamble signal, the forward permutation vector mapping between i) the cyclic shift matrix and ii) a matrix of Walsh-Hadamaard sequences. Second, the fast Hadamaard transform is applied to the permuted preamble signal to generate the set of index values.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

In accordance with the present invention, a code-division, multiple-access (CDMA) preamble detector applies either a Fast Hadamaard Transform (FHT) or a Fast Orthogonal Gold-code Transform (FOGT) to the received spread signal for either of the despreading and preamble signature sequence detection processes. Implementations operating in accordance with the present invention may allow for relatively simple detection circuits. Detection of preamble sequences may allow rapid detection and demodulation of data signals in channels randomly accessed by multiple users in a CDMA telecommunication system, and such channels may be, for example, the random access channel (RACH) of systems operating in accordance with wideband-CDMA (W-CDMA) standards.

For the exemplary implementations of the present invention as described below, a CDMA receiver detects the preamble part of a random access channel (RACH) burst, although the techniques as described herein may be readily extended to other CDMA applications. The RACH burst may be as shown in FIGS. 1A and 1B. In accordance with the exemplary embodiments described herein, the preamble preferably comprises a signature sequence of 16 complex symbols ($\pm 1 \pm j$) (i.e., signature sequence of length 16). A total of 16 different signature sequences may exist and all belong to an Orthogonal Gold Code (OGC) set of length 16. As would be apparent to one skilled in the art however, other sequence lengths (other than length 16) and other types of orthogonal code sequences may be employed, such as Walsh code sequences.

Each symbol of the preamble signature sequence is spread with a 256-chip code sequence from an OGC set of length 256. Consequently, 256 codes sequences are available (code numbers C1, . . . ,C256) and are allocated through the CDMA network for spreading of channels. The code numbers that a user may select are transmitted in the sector-specific broadcast channel (BCCH). The user randomly selects one of the permissible codes and one of the 16 preamble signatures, and uses the selected signature sequence to create the preamble of a RACH burst.

Once the received signal is despread, preamble detection in accordance with exemplary implementations of the present invention correlates signature sequences against the despread input vector (i.e., signal samples) using fast transform techniques, and then forms a decision statistic to identify the preamble signature sequence. If coherent or quasi-coherent detection is employed, preamble detection corrects for phase or amplitude variations (if coherent or quasi-coherent detection is employed) to create the final decision statistic. Once the preamble is detected, demodulation and data detection of the message part of the RACH burst may be in accordance with techniques well known in the art.

Figure 2:
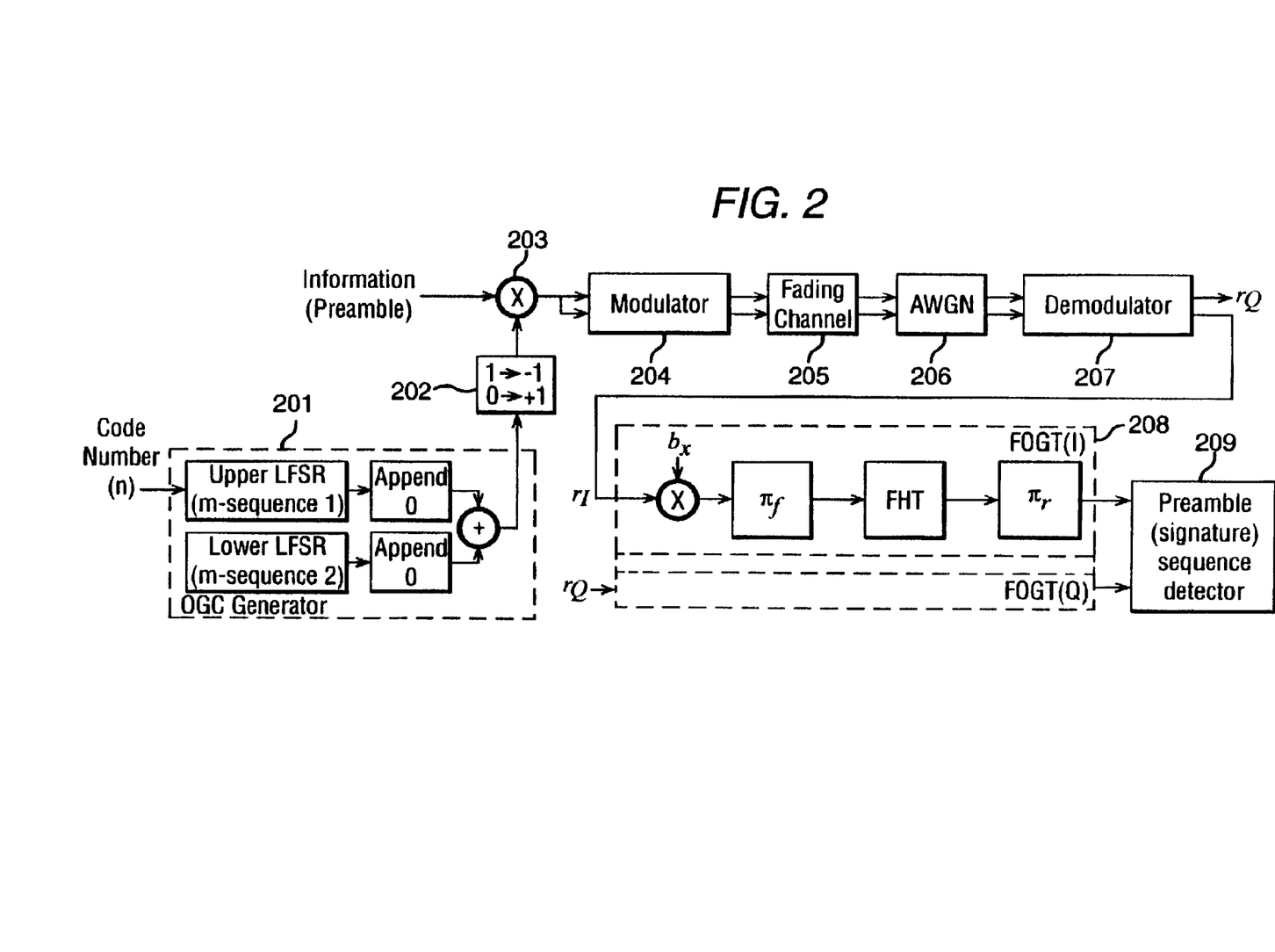
FIG. 2 shows a signal flow block diagram of a RACH burst signal including a preamble detector operating in accordance with an exemplary embodiment of the present invention.

FIG. 2 shows a block diagram representing signal flow for the encoding, transmission, and detection of a RACH burst signal. As shown in FIG. 2, OGC generator 201 provides an OGC sequence (spreading code) based on an input code number. Mapping operator 202 converts the binary values of the OGC sequence from "1" or "0" to "−1" or "1", respectively, and the OGC sequence is then combined with the preamble signature sequence in combiner 203. The signal from combiner 203 input to the modulator 204 is transmitted as a complex signal (in-phase (I) and quadrature (Q) components) through a transmission channel that is a fading channel with additive white, Gaussian noise (AWGN). The transmission channel may be represented as shown in FIG. 2 for convenience of the following description as blocks 205 and 206. Demodulator 207 receives the signal and provides the received spread data signal ($r_I$ and $r_Q$) to code matched filter and despreader (CMF/despreader) 208. CMF/despreader 208 correlates the received spread data signal with members of the OGC set employing the FOGT transform (described subsequently) to despread the RACH preamble. CMF/despreader 208 provides the despread data signal as symbols of the preamble signature sequence, which are then correlated with the set of signature sequences by preamble sequence detector 209 to generate a decision statistic used to identify the signature sequence. Preamble sequence detector 209 may employ the FOGT for correlation if members of an OGC set are used for signature sequences, or may employ the fast Hadamaard transform (FHT) that is well known in the art if Walsh-Hadamaard sequences are used for signature sequences. In either case, the correlation provides a peak value as a decision statistic. For the following description, the real component operations are described, but one skilled in the art may extend the following to complex signals.

The FOGT transform is related to the FHT transform. The FOGT transform may be extended to sequences that belong to any OGC set. Orthogonal Gold code sequences may be generated as a base-2 Galois field (GF(2)) addition of selected pairs of pseudo-random code sequences (m-sequences). The length, or period, of an m-sequence is defined as N, where N is $2^L-1$ and L is the length of the shift register generating the m-sequence (N, L are positive integers). M is defined as the period of each OGC sequence, and the OGC sequence length may be an even length to align chip code periods with data symbol periods. Since an m-sequence has a length that is an odd number, each OGC sequence is generally augmented by one value (e.g., chip or symbol) to provide a sequence having an even length with M being $N+1=2^L$. The OGC set {OGC (a,b)} that is produced by two m-sequences a and b is given in equation (1):

$$OGC(a,b)=\{a, b, Da \oplus b, D^2 a \oplus b, \ldots, D^{N-1} a \oplus b\} \quad (1)$$

where the operator $D^x$ denotes a cyclic shift of the m-sequence a by x positions. A member of the OGC set is not a cyclic shift of another member in the OGC set. A delay of y chips in the OGC sequence may be produced by computing the delays in the corresponding m-sequence generators and initializing the m-sequence generators accordingly.

The OGC set employed in accordance with the exemplary embodiment of the present invention for either spreading the preamble or the signature sequence may be generated as follows. First, the matrix X is formed as shown in equation (2):

$$X = \begin{bmatrix} 0 & 0 \\ \hline 0 & F \end{bmatrix} = \begin{bmatrix} 0 & 0 & 0 & \ldots & 0 & 0 \\ 0 & a_1 & a_2 & \ldots & a_{N-1} & a_N \\ \vdots & \vdots & \vdots & \ldots & \vdots & \vdots \\ 0 & a_N & a_1 & \ldots & a_{N-2} & a_{N-1} \end{bmatrix} \quad (2)$$

where F is the matrix comprising all the cyclic shifts of the m-sequence a with period N. For an OGC set of length 256, for example, the m-sequence a is generated by the polynomial given in equation (3):

$$a(D)=1+D^2+D^3+D^4+D^8 \quad (3)$$

where $D^0$ is 1, or by the recursion $a_i=a_{i-8}+a_{i-6}+a_{i-5}+a_{i-4}$. The matrix $S_{xa}$ is formed by adding the "0" row and column to the matrix F. Adding the "0" row and column accounts for the augmentation of the sequence by one value to provide a sequence of even length.

Second, the column vector $b_x$ is formed as given in equation (4):

$$b_x=[0 \; b]^T \quad (4)$$

where the vector b is the m-sequence b. The m-sequence b for an OGC set of length 256 may be generated by the polynomial given in equation (5):

$$b(D)=1+D^3+D^5+D^6+D^8 \quad (5)$$

or by the recursion $b_i==b_{i-8}+b_{i-5}+b_{i-3}+b_{i-2}$. The column vector $b_x$ is the vector b augmented by a chip value of "0" to provide a sequence of even length.

Third, the matrix C is formed by addition over GF(2) each row of matrix $S_{xa}$ and vector $b_x$ as given by equation (6):

$$C=S_{xa} \oplus b_x \quad (6)$$

For example, each spread RACH preamble symbol may be represented by one of the rows of the 256×256 matrix C derived from equation (6) as given in equation (7):

$$C = \begin{bmatrix} c_{11} & c_{12} & \ldots & c_{1M} \\ c_{21} & c_{22} & \ldots & c_{2M} \\ \vdots & \vdots & \vdots & \vdots \\ c_{M1} & c_{M2} & \ldots & c_{MM} \end{bmatrix} \quad (7)$$

It is well known in the art of communication theory that the optimum detector (or despreader) of a code sequence in AWGN may be realized as a bank of Code Matched Filters (CMFs), where each CMF may be implemented with an FIR filter matched to a corresponding cyclic shift of the code. For a random propagation delay of x chips where the propagation delay does not exceed the period of the code, the CMF matched to the sequence $D^x c_k$ indicates a peak level (i.e., a "hit") once every code period. A bank of CMFs may be employed, with each CMF of the bank being used to detect a different corresponding code sequence (e.g., M-codes detected with uncertainty of M-chips may require $M^2$ CMFs).

A transmitted signal with additive white Gaussian noise (AWGN) that is received at a transceiver (e.g., CMF/despreader 208) may be defined by equation (8):

$$r=Cp_s+n \quad (8)$$

where r is the received vector, C is the OGC matrix with "0"s mapped to "1"s and "1"s mapped to "−1"s, $p_s$ is the symbol of the preamble signature sequence, and n is the noise vector. For the following description, the real component is described, although one skilled in the art may extend the following to complex signal processing.

Figure 3:
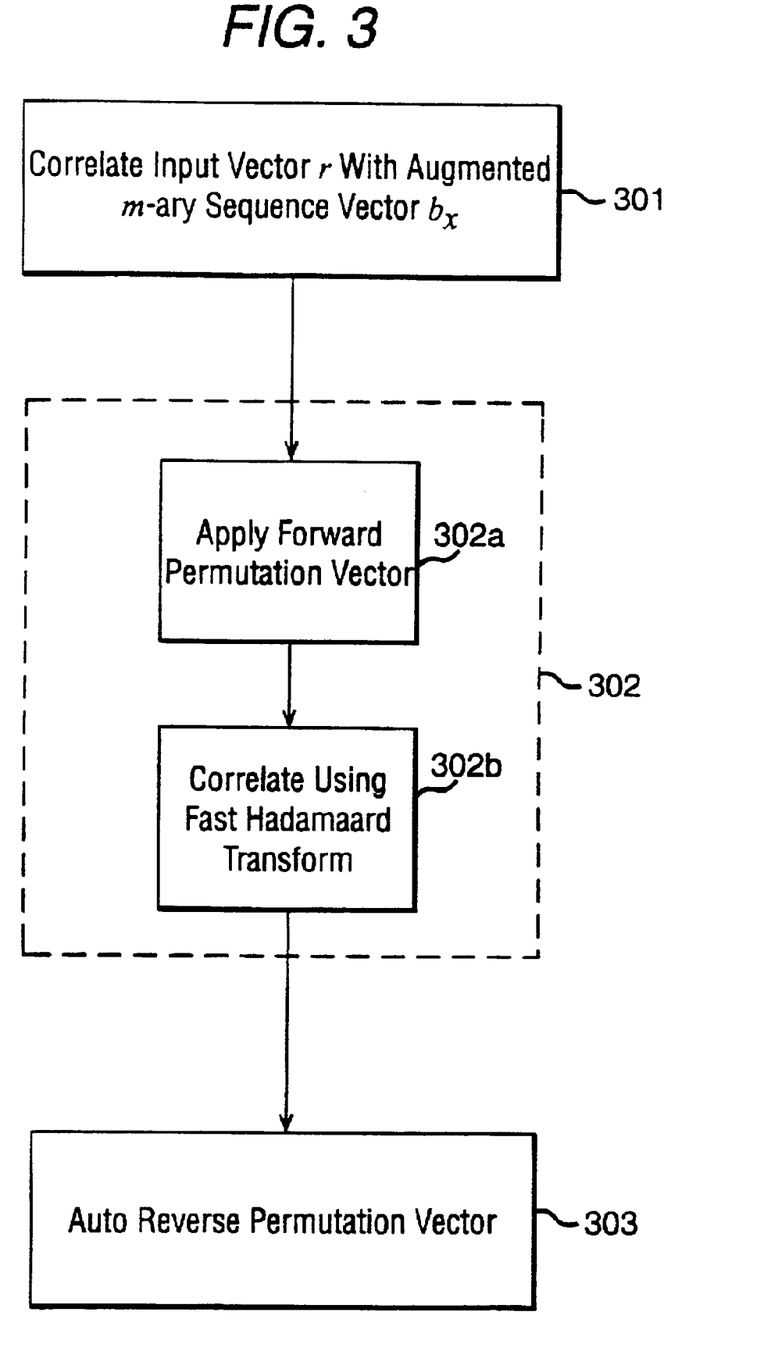
FIG. 3 is an exemplary flow chart for preamble correlation in accordance with the present invention.

FIG. 3 is an exemplary flow chart for the method of block correlation for preamble detection in accordance with embodiments of the present invention. The method of preamble detection comprises three steps: step 301, step 302, and step 303. At step 301, given the relationship between the matrix C and $b_x$ of equations (6) and (7), the received input vector r is correlated with (i.e., multiplied by) the vector $b_x$ (augmented m-sequence b). The vector $b_x$ is constant since the initial value of the feedback register is constant (e.g., always FF hex).

At step 302, the resulting sequence from the combination of r and $b_x$ is correlated with the inverse of the circular matrix C using a forward permutation vector and a fast Hadamaard transform (FHT). The correlation operation with the inverse of C may be implemented as follows. The permutation vector $\pi_f$ is applied to the combination of r and $b_x$ at step 302a. Arranging the sequence that results from the combination of r and $b_x$ with the forward permutation vector $\pi_f$ generates a permuted sequence compatible with block correlation of the FHT transform.

To calculate the permutation vector $\pi_f$, the matrix F is augmented for the additional chip value to form the matrix X as given in equation (9), $$X = \begin{bmatrix} 0 & 0 \\ 0 & F \end{bmatrix} \quad (9)$$

The forward permutation vector $\pi_f$ may be computed as follows given a matrix F having an augmented column and row (such as in equation (9)). For sequences of length $M=2^L$ (M, L integers greater than 1), a permutation vector $\pi_f$ of length L exists that rearranges the rows (columns) of the matrix X, such that the columns (rows) in the resulting matrix W are Walsh-Hadamaard sequences. The forward permutation vector $\pi_f$ may be defined as given in equation (10):

$$\pi_f = [i_1, \ldots, i_L] \quad (10)$$

For example, the entries of the forward permutation vector $\pi_f$ identify the mapping of rows to the matrix W from a matrix X. Since the forward permutation vector $\pi_f$ remains constant it may be computed once through recursive search techniques and stored. Consequently, implementations that apply the permutation vector $\pi_f$ may use a look-up table (LUT).

The method may be shown using sequences of length $M=2^3$ (i.e., L=3) and by considering a polynomial with a smaller degree, e.g., $f(x)=1+x+x^3$ for the m-sequence. For an initial load of [1 1 1], the m-sequence generator provides sequence values in accordance with equation (11), $$x(n)=x(n-3)+x(n-2) \quad (11)$$

to generate the sequence [1 1 1 0 0 1 0]. The F-matrix formed with cyclic shifts of the m-ary sequence a is then generated as given in equation (12):

$$F = \begin{bmatrix} 1 & 1 & 1 & 0 & 0 & 1 & 0 \\ 1 & 1 & 0 & 0 & 1 & 0 & 1 \\ 1 & 0 & 0 & 1 & 0 & 1 & 1 \\ 0 & 0 & 1 & 0 & 1 & 1 & 1 \\ 0 & 1 & 0 & 1 & 1 & 1 & 0 \\ 1 & 0 & 1 & 1 & 1 & 0 & 0 \\ 0 & 1 & 1 & 1 & 0 & 0 & 1 \end{bmatrix} \quad (12)$$

and the matrix F is extended to be the matrix X (from equation (9)) as given in equation (13):

$$X = \begin{bmatrix} 0 & 0 & 0 & 0 & 0 & 0 & 0 & 0 \\ 0 & 1 & 1 & 1 & 0 & 0 & 1 & 0 \\ 0 & 1 & 1 & 0 & 0 & 1 & 0 & 1 \\ 0 & 1 & 0 & 0 & 1 & 0 & 1 & 1 \\ 0 & 0 & 0 & 1 & 0 & 1 & 1 & 1 \\ 0 & 0 & 1 & 0 & 1 & 1 & 1 & 0 \\ 0 & 1 & 0 & 1 & 1 & 1 & 0 & 0 \\ 0 & 0 & 1 & 1 & 1 & 0 & 0 & 1 \end{bmatrix} \quad (13)$$

The permutation vector is $\pi_f=[1\ 7\ 4\ 3\ 6\ 2\ 8\ 5]$, where "1" is the first row of X mapped to the first row of W, "5" is the fifth row of X mapped to the second row of W, and so on. The row permutations of the matrix X according to the forward permutation vector $\pi_f$ are employed to create the matrix W given in equation (14):

$$W = \begin{bmatrix} 0 & 0 & 0 & 0 & 0 & 0 & 0 & 0 \\ 0 & 0 & 1 & 0 & 1 & 1 & 1 & 0 \\ 0 & 1 & 0 & 0 & 1 & 0 & 1 & 1 \\ 0 & 1 & 1 & 0 & 0 & 1 & 0 & 1 \\ 0 & 0 & 1 & 1 & 1 & 0 & 0 & 1 \\ 0 & 0 & 0 & 1 & 0 & 1 & 1 & 1 \\ 0 & 1 & 1 & 1 & 0 & 0 & 1 & 0 \\ 0 & 1 & 0 & 1 & 1 & 1 & 0 & 0 \end{bmatrix} \quad (14)$$

As would be apparent to one skilled in the art, the orthogonal matrix W is a matrix with columns representing Walsh-Hadamaard sequences of the 8×8 Walsh-Hadamaard matrix, and so the matrix W may be block correlated using the FHT transform. Consequently, in accordance with the exemplary embodiment, the input sequence (the combination of r and $b_x$) may, for the ideal channel, be a row of the matrix X, and applying the forward permutation vector $\pi_f$ maps the input sequence into a corresponding column of the matrix W.

Returning to FIG. 3, the resulting sequence of step 302a is then processed with the fast Hadamaard transform (FHT) at step 302b. For step 302b, the FHT (e.g., the 256-point FHT) is applied to the permuted sequence (i.e., combination of r and $b_x$ arranged in accordance with the permutation vector $\pi_f$) to generate the output vector z (for the exemplary implementation with OGC sequences of length 256, $z=(z_1, z_2, \ldots, z_{256})$). The output vector z corresponds to the block correlation of the signal sequence in W with the members of the OGC set.

At step 303, a reverse permutation vector $\pi_r$ is applied to the output vector z to generate the correlated output sequence. Given the output vector z, the index of the vector z is mapped to the corresponding OGC number. The reverse permutation vector $\pi_r$ for this mapping is calculated based on the one-to-one relationship between the code or signature number and the index of the correlation peak in the FHT output vector z from the block correlator (e.g., CMF/despreader 208 in FIG. 2).

For an OGC set used for spreading (e.g., OGC set of length 256) and an OGC set used for signature sequences (e.g., OGC set of length 16), the received signal is despread using the sequence of the code number, then the despread signal is applied to the preamble sequence detector 209 in FIG. 2. The despread signal may again be processed in accordance with the FOGT transform (i.e., have a forward permutation vector $\pi_r$ applied, be FHT processed, and then have a reverse permutation vector $\pi_r$ applied). However, for preamble detection, information of both the in-phase (I) and quadrature-phase (Q) channels may be employed.

The despread I and Q channel signals ($r_I$ and $r_Q$) may be split into two branches for processing: a reference branch and a data branch. The reference branch is employed for channel estimation and frequency acquisition, if required. For example, the squared magnitude complex FHT vector signal of length 16 is calculated and the maximum index i, where i, {1, . . . 16}, is selected for a non-coherent preliminary decision statistic. The index i may then be used by a Walsh generator to reproduce the bi-phase shift-keyed (BPSK) signature sequence, a selector to select one of the 16 FHT outputs for coherent detection, or as the decision statistic itself for incoherent detection. Exemplary embodiments of a coherent RACH preamble detector are shown in FIGS. 4 and 5.

Figure 4:
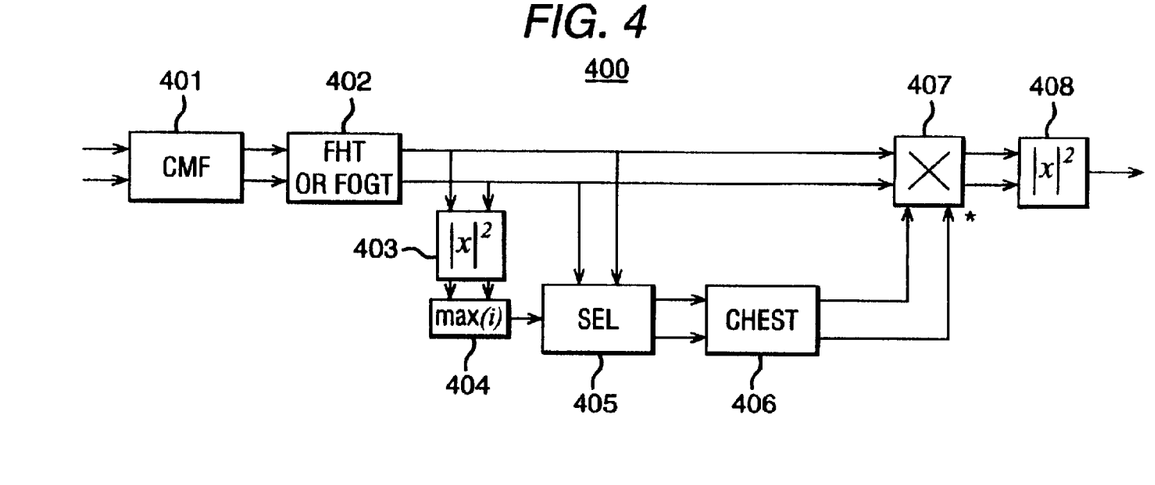
FIG. 4 shows a preamble detector operating in accordance with an exemplary embodiment of the present invention generating a coherent detection statistic.
Figure 5:
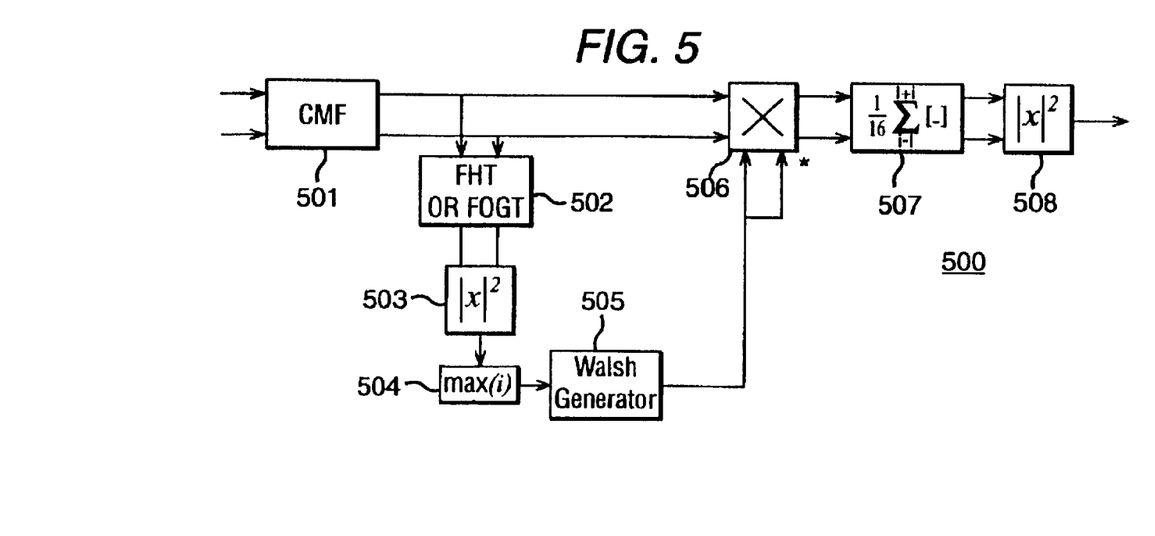
FIG. 5 shows an alternative embodiment of the preamble detector shown in FIG. 4.

FIG. 4 shows a preamble detector 400 operating in accordance with an exemplary embodiment of the present invention using coherent detection. The preamble detector 400 may be included in a demodulator for a random access channel (RACH) of a code-division, multiple-access (CDMA) telecommunication receiver. The input signal is first applied to a code-matched filter (CMF) 401 that is matched to the spreading code sequence of the input signal. For example, in accordance with an IS-95 standard, the code may be an OGC sequence at a spreading chip weight. The output of the CMF 401 is the despread preamble signal sampled at the symbol rate, which is the rate of the Walsh-Hadamaard code sequence employed as the signature sequence for the RACH.

The output of the CMF 401 is correlated by an FHT or FOGT correlator 402 to block correlate the despread preamble signal with the signature sequence. The signal from FHT or FOGT correlator 402 is then provided to two paths. For the exemplary embodiments described herein, the FHT or FOGT correlator 402 provides a group of either FHT or FOGT code-words of length 16 matching the 16 Walsh code or OGC signature sequences, respectively, that may be transmitted by a user. Each of the decoded signals from FHT or FOGT correlator 402 is provided in the second path to a magnitude-squared operator 403 and the output provided to the maximum valued index (max (I)) operator 404. The max (I) operator 404 determines which decoded signal of FHT or FOGT correlator 402 has the greatest magnitude squared value corresponding to the index of the signature sequence of the preamble.

Based upon the output of the max (I) operator 404, a selector (SEL) 405 selects the decoded signal from FHT or FOGT correlator 402 having the corresponding index value. SEL 405 provides the selected, decoded signal to the channel estimator (CHEST) 406. CHEST 406 provides an estimate of the amplitude and the phase signal for derotating the selected, decoded signal and provides the estimate to combiner 407. Combiner 407 combines the estimate for the in-phase channel and the estimate for the quadrature-phase channel with the corresponding in-phase and quadrature-phase channels of the decoded signal in the first path from FHT or FOGT correlator 402. The derotated signal provided by combiner 407 is magnitude squared in operator 408 and the output provided as the final decision statistic L(Y). The final decision statistic L(Y) may then be used by a demodulator, controller, or other processing circuitry to identify and synchronize demodulation of the RACH burst information.

FIG. 5 shows an alternative embodiment of the preamble detector 500 operating in accordance with the present invention with Walsh codes used for signature sequences. The input signal is applied to code matched filter (CMF) 501 and the output signal is then provided to two paths. In the first path, the output of the CMF 501 is applied to combiner 506. In the second path, the output of the CMF 501 is applied to FHT correlator 502. The FHT 502 provides, for example, 16 decoded (fast Hadamaard transformed) signals generated from the output of the CMF 501. Each of the decoded signals of FHT correlator 502 is applied to the magnitude squared operator 503 that provides magnitude value for each corresponding decoded signal. The max (I) operator 504 determines the index of the Walsh code sequence corresponding to the decoded signal from FHT 502 having the greatest magnitude squared value. The index provided by max (I) operator 504 is then provided to a Walsh generator 505 which then selects an appropriate Walsh code sequence and its conjugate signal for combining with the output of CMF 501 in combiner 506. An integrator 507 integrates the output signals for each of the in-phase and quadrature-phase channels provided from the combiner 506. The integrated signal is then provided to a magnitude-squared operator 508 that provides a magnitude-squared value for the input signal. This output value from magnitude squared operator 508 is then used as the final decision statistic L(Y).

Figure 6:
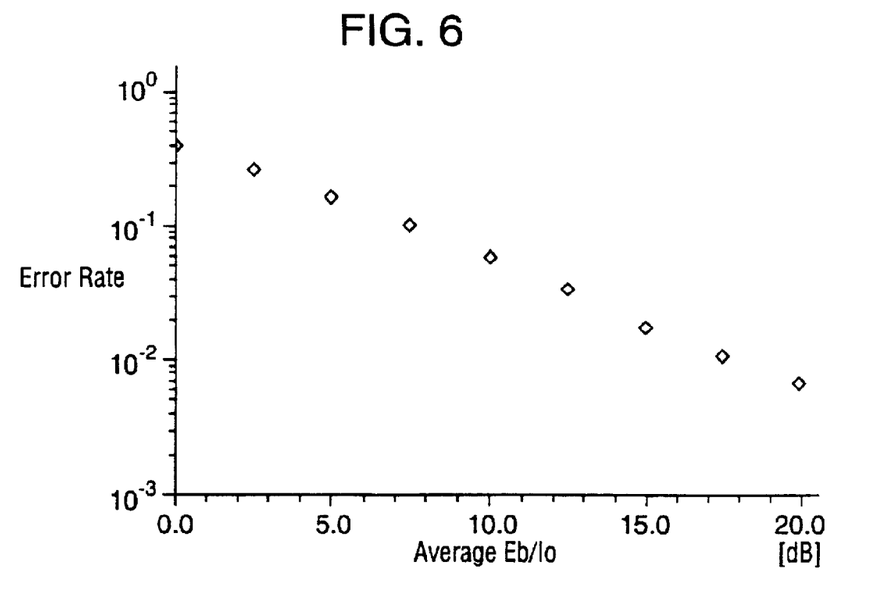
FIG. 6 is a graph of the probability that the incorrect decoded signal of the preamble detector of FIGS. 4 and 5 will be selected in a single path Rayleigh fading channel.
Figure 7:
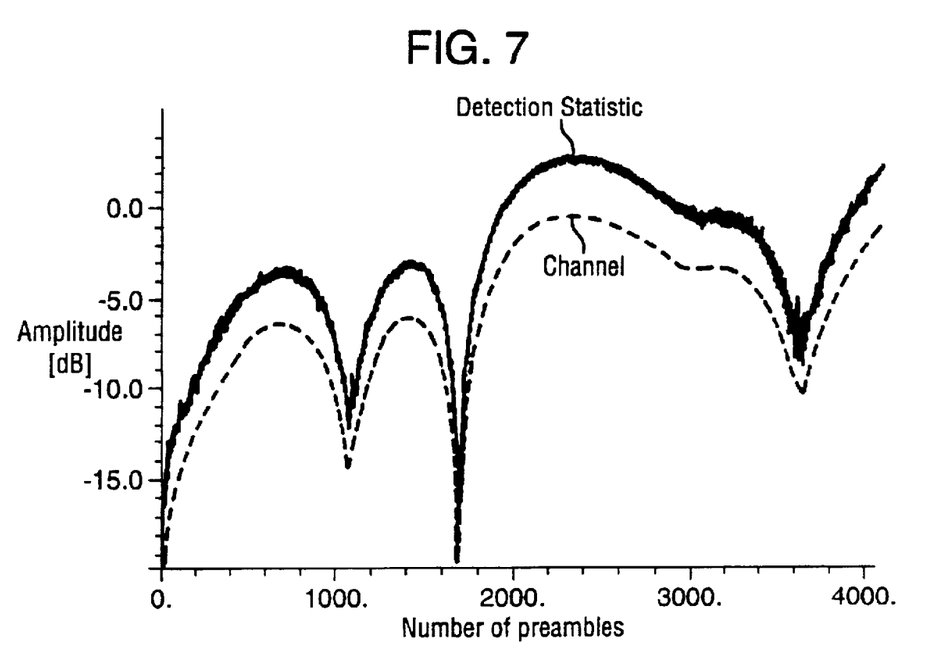
FIG. 7 is a graph of the envelope of the decoded signal of the preamble detector of FIGS. 4 and 5 that fluctuates according to the channel variations.

Simulation results may be employed to show expected performance of implementations of preamble detectors of FIGS. 4 and 5 operating in accordance with the present invention. FIG. 6 is a graph showing the probability that an incorrect decoded signal (i.e., the output of FHT correlator) will be selected in a single path Rayleigh fading channel (Jakes model, with v-120 km/hr). FIG. 7 is a graph showing the envelope of the decoded signal (output of FHT correlator) that fluctuates according to the channel variations. The I and Q components of this decoded signal may be used to estimate the channel characteristics with, for example, low pass filtering.

While the exemplary embodiments of the present invention have been described with respect to processes of circuits, the present invention is not so limited. As would be apparent to one skilled in the art, various functions of circuit elements may also be implemented in the digital domain as processing steps in a software program. Such software may be employed in, for example, a digital signal processor, micro-controller or general purpose computer.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It will be further understood that various changes in the details, materials, and arrangements of the parts which have been described and illustrated in order to explain the nature of this invention may be made by those skilled in the art without departing from the principle and scope of the invention as expressed in the following claims.

We claim:

1. A method of detecting one of a set of preamble sequences in a spread signal comprising the steps of:
   (a) correlating a received spread signal with sequences of a first orthogonal Gold code (OGC) set in accordance with a first fast transform to provide a preamble signal;
   (b) correlating the preamble signal with the set of preamble sequences in accordance with a second fast transform to generate a set of index values, wherein each index value of the set of index values corresponds to a one preamble sequence of the set of preamble sequences;
   (c) forming a decision statistic based on the set of index values; and
   (d) selecting, as the detected one of the set of preamble sequences, a preamble sequence corresponding to the decision statistic;
   wherein step (c) comprises the steps of:
   1) forming an initial decision statistic based on the a relative maximum index of the set of index values;
   2) selecting a signal generated by the preamble signal combined with the preamble sequence corresponding to the relative maximum index of the initial decision statistic;
   3) adjusting, in one or more of amplitude and phase, the selected signal in step 2); and
   4) forming the decision statistic based on the adjusted selected signal.

2. The invention as recited in claim 1, wherein, for step (a), the first fast transform method is a fast orthogonal Gold code transform (FOGT) comprising the steps of
   1) multiplying the received spread signal with a first sequence vector and a forward permutation vector to generate a permuted sequence signal, wherein:
      the first OGC set is generated from the first sequence vector and a cyclic shift matrix of a second sequence vector, and the forward permutation vector maps between i) the cyclic shift matrix of the second sequence vector and ii) a matrix of Walsh-Hadamaard sequences; and
   2) applying a fast Hadamaard transform to the permuted sequence signal to generate a set of correlated signals, the preamble signal selected as one of the set of correlated signals based on a predetermined decision criterion.

3. The invention as recited in claim 1, wherein:
   for step (b), the set of preamble sequences are selected from a second OGC set formed from first and second sequence vectors, the second OGC set generated from the first sequence vector and a cyclic shift matrix of the second sequence vector; and wherein the second fast transform is a fast orthogonal Gold code transform (FOGT) comprising the steps of
   1) multiplying the preamble signal with the first sequence vector and a forward permutation vector to generate a permuted preamble signal, the forward permutation vector mapping between i) the cyclic shift matrix of the second sequence vector and ii) a matrix of Walsh-Hadamaard sequences, and
   2) applying a fast Hadamaard transform to the permuted preamble signal to generate the set of index values.

4. The invention as recited in claim 1, wherein, for step (b), the set of preamble sequences are selected from set of Walsh-Hadamaard sequences, and the second fast transform is a fast Hadamaard transform.

5. The invention as recited in claim 1, wherein, for step (a), the received spread signal is a burst of a random-access channel in a code-division, multiple-access communication system.

6. The invention as recited in claim 1, wherein step (c3) adjusts the selected signal by estimating a channel response from the preamble signal, forming a de-rotation signal from the preamble signal, and combining the de-rotation signal with the preamble signal for coherent sequence detection.

7. The invention as recited in claim 1, wherein step (c2) employs the initial decision statistic to locally generate a corresponding preamble sequence, the locally generated preamble sequence being combined with the preamble signal for coherent sequence detection.

8. A method of detecting one of a set of preamble sequences in a spread signal comprising the steps of:
   (a) correlating a received spread signal with a set of orthogonal sequences to provide a preamble signal;
   (b) correlating the preamble signal with one or more preamble sequences of an orthogonal Gold code (OGC) set in accordance with a fast transform to generate a set of index values, wherein each index value of the set of index values corresponds to a one preamble sequence of the set of preamble sequences;
   (c) forming a decision statistic based on the set of index values; and
   (d) selecting, as the detected one of the set of preamble sequences, a preamble sequence corresponding to the decision statistic;
   wherein step (c) comprises the steps of:
   1) forming an initial decision statistic based on a relative maximum index of the set of index values;
   2) selecting a signal generated by the preamble signal combined with the preamble sequence corresponding to the relative maximum index of the initial decision statistic;
   3) adjusting, in one or more of amplitude and phase, the selected signal in step 2); and
   4) forming the decision statistic based on the adjusted selected signal.

9. The invention as recited in claim 8, wherein:
   for step (b), each preamble sequence is selected from the OGC set formed from first and second sequence vectors, wherein the OGC set is generated from the first sequence vector and a cyclic shift matrix of the second sequence vector; and wherein
   the fast transform is a fast orthogonal Gold code transform (FOGT) comprising the steps of
   1) multiplying the preamble signal with the first sequence vector and a forward permutation vector to generate a permuted preamble signal, the forward permutation vector mapping between i) the cyclic shift matrix of the second sequence vector and ii) a matrix of Walsh-Hadamaard sequences; and 2) applying a fast Hadamaard transform to the permuted preamble signal to generate the set of index values.

10. A preamble detector for detecting one of a set of preamble sequences in a spread signal, the preamble detector comprising:

a first correlator correlating a received spread signal with sequences of a first orthogonal Gold code (OGC) set in accordance with a first fast transform to provide a preamble signal;

a second correlator correlating the preamble signal with the set of preamble sequences in accordance with a second fast transform method to generate a set of index values, wherein each index value of the set of index values corresponds to a one preamble sequence of the set of preamble sequences;

a circuit forming a decision statistic based on the set of index values; and a selector selecting, as the detected one of the set of preamble sequences, a preamble sequence corresponding to the decision statistic;

wherein the circuit forming the decision statistic comprises:

a first magnitude detector forming an initial decision statistic based on a relative maximum index of the set of index values;

a signal selector selecting a signal generated by the preamble signal combined with the preamble sequence corresponding to the relative maximum index of the initial decision statistic;

a coherent detector adjusting, in one or more of amplitude and phase, the selected signal from the signal selector; and a second magnitude detector forming the decision statistic based on the adjusted selected signal.

11. The invention as recited in claim 10, wherein the first fast transform is a fast orthogonal Gold code transform (FOGT), the first OGC set is generated from a first sequence vector and a cyclic shift matrix of a second sequence vector, and a forward permutation vector maps between i) the cyclic shift matrix of the second sequence vector and ii) a matrix of Walsh-Hadamaard sequences; and wherein:

the first correlator comprises:

a multiplier multiplying the received spread signal with the first sequence vector and the forward permutation vector to generate a permuted sequence signal; and a combiner applying a fast Hadamaard transform to the permuted sequence signal to generate a set of correlated signals, the preamble signal selected as one of the set of correlated signals based on a predetermined decision criterion.

12. The invention as recited in claim 10, wherein:

the set of preamble sequences is selected from a second OGC set formed from first and second sequence vectors, the second OGC set generated from the first sequence vector and a cyclic shift matrix of the second sequence vector; and the second fast transform is a fast orthogonal Gold code transform (FOGT); and wherein:

the second correlator comprises:

a multiplier multiplying the preamble signal with the first sequence vector and a forward permutation vector to generate a permuted preamble signal, the forward permutation vector mapping between i) the cyclic shift matrix of the second sequence vector and ii) a matrix of Walsh-Hadamaard sequences, and a combiner applying a fast Hadamaard transform to the permuted preamble signal to generate the set of index values.

13. The invention as recited in claim 10, wherein the set of preamble sequences is selected from a set of Walsh-Hadamaard sequences, and the second fast transform is a fast Hadamaard transform.

14. The invention as recited in claim 10, wherein the received spread signal is a burst of a random-access channel in a code-division, multiple-access communication system.

15. The invention as recited in claim 10, wherein the coherent detector includes a channel estimator for i) estimating a channel response from the preamble signal, and ii) forming a de-rotation signal from the preamble signal, and a combiner for combining the de-rotation signal with the preamble signal for coherent sequence detection.

16. The invention as recited in claim 10, wherein the coherent detector includes a sequence generator, the sequence generator employing the initial decision statistic to locally generate a corresponding preamble sequence; and a combiner combining the locally generated preamble sequence with the preamble signal for coherent sequence detection.

17. The invention as recited in claim 10, wherein the preamble detector is embodied in an integrated circuit.

18. A preamble detector for detecting one of a set of preamble sequences in a spread signal comprising the:

a first correlator correlating a received spread signal with a set of orthogonal sequences to provide a preamble signal;

a second correlator correlating the preamble signal with one or more preamble sequences of an orthogonal Gold code (OGC) set in accordance with a fast transform to generate a set of index values, wherein each index value of the set of index values corresponds to a one preamble sequence of the set of preamble sequences;

a circuit forming a decision statistic based on the set of index values; and a selector selecting, as the detected one of the set of preamble sequences, a preamble sequence corresponding to the decision statistic;

wherein the circuit forming the decision statistic comprises:

a first magnitude detector forming an initial decision statistic based on a relative maximum index of the set of index values;

a signal selector selecting a signal generated by the preamble signal combined with the preamble sequence corresponding to the relative maximum index of the initial decision statistic;

a coherent detector adjusting, in one or more of amplitude and phase, the selected signal from the signal selector; and a second magnitude detector forming the decision statistic based on the adjusted selected signal.

19. The invention as recited in claim 18, wherein:

each preamble sequence is selected from the OGC set formed from first and second sequence vectors, wherein the OGC set is generated from the first sequence vector and a cyclic shift matrix of the second sequence vector and the fast transform is a fast orthogonal Gold code transform (FOGT); and wherein the second correlator comprises:

a multiplier multiplying the preamble signal with the first sequence vector and a forward permutation vector to generate a permuted preamble signal, the forward permutation vector mapping between i) the cyclic shift matrix of the second sequence vector and ii) a matrix of Walsh-Hadamaard sequences; and a combiner applying a fast Hadamaard transform to the permuted preamble signal to generate the set of index values.

20. The invention as recite in claim 19, wherein the preamble detector is embodied in an integrated circuit.

* * * * *